(12) United States Patent
Gill et al.

(10) Patent No.: US 8,977,756 B2
(45) Date of Patent: Mar. 10, 2015

(54) SWAN: ACHIEVING HIGH UTILIZATION IN NETWORKS

(71) Applicant: Microsoft Corporation, Redmond, WA (US)

(72) Inventors: Vijay Gill, Hunts Point, WA (US); Chi-Yao Hong, Urbana, IL (US); Srikanth Kandula, Redmond, WA (US); Ratul Mahajan, Seattle, WA (US); Mohan Nanduri, Ashburn, VA (US); Roger Peter Wattenhofer, Bellevue, WA (US); Ming Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 13/738,969

(22) Filed: Jan. 10, 2013

(65) Prior Publication Data

US 2014/0195689 A1    Jul. 10, 2014

(51) Int. Cl.
*H04L 12/26* (2006.01)
*H04L 29/08* (2006.01)
(Continued)

(52) U.S. Cl.
CPC .......... *H04L 67/2833* (2013.01); *H04L 47/00* (2013.01); *H04L 41/0896* (2013.01); *H04L 45/302* (2013.01); *H04L 43/0882* (2013.01); *H04L 45/02* (2013.01)
USPC ........... 709/226; 709/223; 709/224; 709/206; 713/187; 713/165; 713/157; 705/26.1; 705/34; 705/27.1; 370/246; 370/446; 370/216

(58) Field of Classification Search
CPC ....................................................... H04L 12/26
USPC ................................. 709/224, 223, 206, 226
See application file for complete search history.

(56) References Cited

U.S. PATENT DOCUMENTS 7,933,205 B1    4/2011  Shaw et al.
8,190,593 B1 *  5/2012  Dean ............................ 707/707
(Continued)

OTHER PUBLICATIONS

Stoica, et al., "Core-Stateless Fair Queuing: Achieving Approximately Fair Bandwidth Allocations in High Speed Networks", In Proceedings of the ACM SIGCOMM Conference on Applications, Technologies, Architectures and Protocols for Computer Communication, Sep. 2, 2008, 13 pages.

(Continued)

*Primary Examiner* — Jude Jean Gilles
(74) *Attorney, Agent, or Firm* — Brian Haslam; Kate Drakos; Micky Minhas

(57) ABSTRACT

Greater network utilization is implemented through dynamic network reconfiguration and allocation of network services and resources based on the data to be transferred and the consumer transferring it. A hierarchical system is utilized whereby requests from lower layers are aggregated before being provided to upper layers, and allocations received from upper layers are distributed to lower layers. To maximize network utilization, paths through the network are reconfigured by identifying specific types of packets that are to be flagged in a specific manner, and then by further identifying specific routing rules to be applied in the transmission of such packets. Network reconfiguration is performed on an incremental basis to avoid overloading a path, and capacity can be reserved along one or more paths to prevent such overloading. Background data is agnostic as to specific transmission times and is utilized to prevent overloading due to reconfiguration.

20 Claims, 5 Drawing Sheets

(51) Int. Cl.
*H04L 12/70* (2013.01)
*H04L 12/24* (2006.01)
*H04L 12/725* (2013.01)
*H04L 12/751* (2013.01)

(56) References Cited

U.S. PATENT DOCUMENTS

| | | | |
|---|---|---|---|
| 8,832,063 B1* | 9/2014 | Dean | 707/707 |
| 2006/0050634 A1 | 3/2006 | Gous | |
| 2006/0109832 A1* | 5/2006 | Ginzburg | 370/346 |
| 2007/0121870 A1 | 5/2007 | Herold et al. | |
| 2007/0179907 A1* | 8/2007 | Waris | 705/76 |
| 2010/0228881 A1 | 9/2010 | Williams et al. | |
| 2011/0299389 A1 | 12/2011 | Mau et al. | |
| 2012/0131144 A1 | 5/2012 | Cooper et al. | |
| 2012/0314573 A1 | 12/2012 | Edwards et al. | |
| 2012/0314578 A1 | 12/2012 | Averi et al. | |
| 2013/0003538 A1 | 1/2013 | Greenberg et al. | |
| 2013/0003553 A1 | 1/2013 | Samuels et al. | |
| 2014/0195689 A1* | 7/2014 | Gill et al. | 709/226 |

OTHER PUBLICATIONS

"Network Performance, QoS, Security, Management and Emerging Technologies", Retrieved on: Jan. 30, 2013, Available at: http://www.netbook.cs.purdue.edu/PDFdocuments/ch28.pdf.
Al-Fares, et al., "Hedera: Dynamic Flow Scheduling for Data Center Networks", In Proceedings of the 7th USENIX Conference on Networked Systems Design and Implementation, Apr. 28, 2010, 15 pages.
Benson, et al., "MicroTE: Fine Grained Traffic Engineering for Data Centers", In Proceedings of the Seventh Conference on Emerging Networking Experiments and Technologies, Article No. 8, Dec. 6, 2011, 12 pages.
Bhatnagar, et al., "Creating Multipoint-to-Point LSPs for Traffic Engineering", In Workshop on High Performance Switching and Routing, Jun. 24, 2003, 7 pages.
Blake, et al., "An Architecture for Differentiated Services", In Proceedings of RFC: An Architecture for Differentiated Service, Dec. 1998, 34 pages.
Braden, et al., "Integrated Services in the Internet Architecture: An Overview", In Proceedings of RFC: Integrated Services in the Internet Architecture: An Overview, Jul. 1994, 28 pages.
Curtis, et al., "DevoFlow: Scaling Flow Management for High-Performance Networks", In Proceedings of the ACM SIGCOMM Conference, Aug. 15, 2011, 12 pages.
Ferguson, et al., "Participatory Networking", In 2nd USENIX Workshop on Hot Topics in Management of Internet, Cloud, and Enterprise Networks and Services, Apr. 24, 2012, 6 pages.
Ghorbani, et al., "Walk the Line: Consistent Network Updates with Bandwidth Guarantees", In Proceedings of the First Workshop on Hot Topics in Software Defined Networks, Aug. 13, 2012, 6 pages.
Hartman, et al., "How to Split a Flow?", In Proceedings of IEEE INFOCOM, Mar. 25, 2012, 9 pages.
Kandula, et al., "Walking the Tightrope: Responsive Yet Stable Traffic Engineering", In Proceedings of the Conference on Applications, Technologies, Architectures, and Protocols for Computer Communications, Aug. 21, 2005, 12 pages.
McGeer, Rick, "A Safe, Efficient Update Protocol for OpenFlow Networks", In Proceedings of the First Workshop on Hot Topics in Software Defined Networks, Aug. 13, 2012, 6 pages.
Meyer, et al., "MPLS Traffic Engineering Soft Preemption", In Proceedings of Internet Engineering Task Force (IETF)—Request for Comments: 5712, Jan. 2010, 13 pages.
Mirrokni, et al., "A Simple Polynomial Time Framework for Reduced-Path Decomposition in Multi-Path Routing", In Twenty-third Annual Joint Conference of the IEEE Computer and Communications Societies, vol. 1, Mar. 7, 2004, 11 pages.
Pathak, et al., "Latency Inflation with MPLS-Based Traffic Engineering", In Proceedings of the ACM SIGCOMM Conference on Internet Measurement Conference, Nov. 2, 2011, 9 pages.
Reitblatt, et al., "Abstractions for Network Update", In Proceedings of the ACM SIGCOMM Conference on Applications, Technologies, Architectures, and Protocols for Computer Communication, Aug. 13, 2012, 12 pages.
Vahdat, Amin, "A Software Defined WAN Architecture", In Proceedings of Open Networking Summit, Apr. 18, 2012, 33 pages.
"International Search Report & Written Opinion for PCT Patent Application No. PCT/US2014/010946", Mailed Date : Sep. 26, 2014, 16 pages.

* cited by examiner

SWAN: ACHIEVING HIGH UTILIZATION IN NETWORKS

BACKGROUND

There exist a myriad of advantages to being able to transfer computer-readable data between and among two or more computing devices. Typically, such transfers are most conveniently carried out through the exchange of communications across a network of computing devices. As such, the quantity of data being transferred across networks of computing devices continues to increase. To support the transfer of such increasing amounts of data, providers of computer network services invest a substantial amount of resources into computer networking hardware. Maximizing the utilization of such computer networking hardware can, therefore, be desirable from an efficiency standpoint.

Unfortunately, consumers that generate network data traffic are often unaware of one another, and simply utilize a network to transfer their data whenever they desire to do so. Often such consumers seek to transfer large volumes of data across a network of computing devices during the same time periods, thereby excessively taxing the network. Such overlapping transfers can occur even if one or more consumers may have the option of delaying their transfers to another time, since mechanisms are not provided by which such data transfers can be time shifted to a more convenient time. Consequently, not only can such inflexibility result in periods of excessive network taxation, they can also result in other time periods during which such consumers are mostly idle, which can result in an underutilization of the network. Consequently, the providers of computer network services are often forced to purchase costly computer networking hardware to accommodate those instances when multiple consumers of network services all seek to transfer large volumes of data during the same time periods, knowing that such costly computer networking hardware will likely remain underutilized for substantial portions of its service life.

SUMMARY

In one embodiment, a centralized controller can receive requests from consumers seeking to access network services. Such requests can indicate whether the data to be transferred is insensitive as to the specific time when it is transferred. The centralized controller can also receive information regarding network topology, statistics and failures. Utilizing such information, the centralized controller can assign, to one or more consumers, or classes of consumers, a predetermined portion of the available network services, and such consumers can limit their utilization of the requested network services to the portion assigned to them.

In yet another embodiment, during periods of network underutilization, the centralized controller can assign greater portions of the available network services to consumers whose data is insensitive as to the specific time when it is transferred. The portions of network services assigned to consumers can be doled out to individual consumers by one or more brokers, thereby providing a hierarchical structure for efficiently handling a greater quantity of consumers and requests.

In a still further embodiment, service-level goals and priorities can be respected based upon weights or priorities that can be assigned and then utilized as a basis on which to allocate available network services. Similarly, in allocating the network services, specific time-based constraints, such as deadlines, can be honored through a shifting of lower priority data transfers to a later time.

In a further embodiment, the centralized controller can select from among multiple paths through a network of computing devices by which consumers can transmit data across the computer network. Such paths can be informed by network topology information received by the centralized controller, and the centralized controller can dynamically reconfigure such paths in accordance with the type and quantity of data requested to be transmitted across the network by the consumers of such networking services.

In a still further embodiment, network reconfiguration can be effected by the centralized controller through packet labeling mechanisms, whereby the centralized controller can generate a series of rules for identifying and labeling relevant packets, and can also generate a series of rules for entry into a flow table which can inform one or more switches, or like networking computing devices, as to how such packets are to be transmitted across the network.

In a yet further embodiment, network reconfiguration can be performed on an incremental basis to avoid overloading any network path or link. Excess capacity can be reserved to accommodate such a reconfiguration. Alternatively, the transfer of background data, which can be transferred at any time, can be deferred in favor of other more time-critical traffic, thereby providing excess capacity for incremental network reconfiguration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
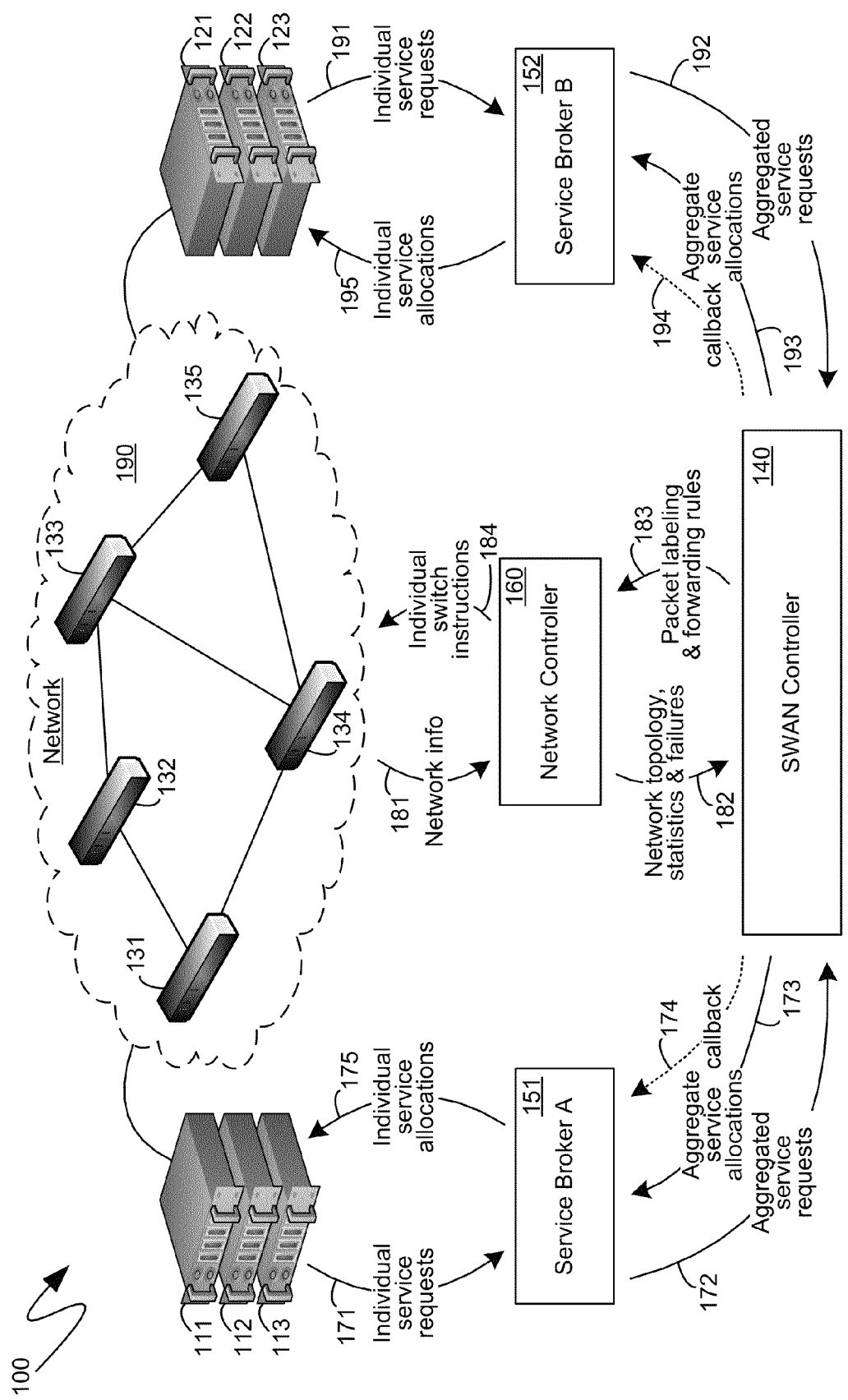
FIG. 1 is a block diagram of an exemplary architecture providing greater network utilization.

The following description relates to a software-controlled network in which greater network utilization is implemented through dynamic network reconfiguration and allocation of network services and resources in accordance with a type of data to be transferred and a type of consumer of such network services and resources. Interactive data critical to real-time user experiences can be transmitted through the network in a traditional manner. Elastic data that can be insensitive, but not agnostic, to a specific transmission time can be transmitted in accordance with network resource allocations that can be granted in response to pre-submitted requests. A hierarchical system can be utilized whereby requests from a lower layer can be aggregated before being provided to an upper layer, and allocations received from an upper layer can be distributed to lower layers. To maximize network utilization, paths through the network can be reconfigured or redirected by identifying specific types of packets that are to be flagged in a specific manner, and then by further identifying specific routing rules to be applied in the transmission of such packets across the network. Network reconfiguration can be performed on an incremental basis to avoid overloading a path or link, and capacity can be reserved along one or more paths or links to prevent such overloading. Background data that can be agnostic to a specific transmission time can also be utilized to prevent such overloading, by reducing the portion of network services allocated to such background data.

The techniques described herein make reference to specific types of network services and specific types of network consumers. For example, the descriptions below will be primarily directed to the provision of network bandwidth. Such references, however, are strictly exemplary and are made for clarity of description and presentation and for ease of understanding. Indeed, the techniques described herein are equally applicable, without modification, to the provision of other types of network services such as, for example, the transfer of data meeting specified latency requirements, the transfer of data meeting specified loss requirements, and other like definable network services.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, comprising a network 190 of computing devices. For purposes of providing an exemplary basis for the descriptions below, the network 190 is shown as comprising multiple specific-purpose computing devices in the form of switches 131, 132, 133, 134 and 135 that are interconnected in the manner shown in FIG. 1. One or more computing devices, such as the computing devices 111, 112, 113, 121, 122 and 123 can execute computer-executable instructions that can generate and consume data and, as such, can act as consumers of the network 190. For example, the computing devices 111 and 121 can execute computer-executable instructions directed to a website that sells products online. The computing device 111 can have stored thereon account information, in the form of computer readable data, for users whose last names begin with the letters A-M. Similarly, the computing device 121 can have stored thereon account information for users whose last names begin with the letters N-Z. If a user whose last name began with the letter A established communications with the computing device 121, and then sought to access their account, the computing device 121 could request, over the network 190, the account information for such a user from the computing device 111 and, in response, the computing device 111 could provide, over the network 190, the data representing such a user's account. In such a manner, the computer-readable instructions executing on the computing devices 111 and 121 can be consumers of the services provided by the network 190.

In one embodiment, prior to utilizing the services of the network 190, such as prior to transmitting a quantity of data across the network 190, a consumer can first request to be allocated some portion of the network resources in order to transmit the quantity of data. For example, if the computing devices 112 and 122 were executing computer-executable instructions directed to a search engine, and the computing device 112 sought to transfer, to the computing device 122, ten terabytes of data, processes associated with the search engine executing on the computing device 112 can make a service request, such as one of the individual service requests 171, to a service broker, such as the service broker 151, requesting to transfer 10 TB of data across the network 190. In making such an individual service request 171, not only can the quantity of data to be transferred across the network 190 be specified, but additional metadata regarding such data to be transferred can also be specified. For example, the search engine being executed by the computing device 112 can indicate, as part of the individual service request 171 that it desires to transfer the ten terabytes of data within the next 24 hours.

In another embodiment, only specific types of utilizations of the network 190 can be requested in advance, such as by the individual service requests 171. More specifically, transfers of interactive data can occur immediately and in a traditional manner, without first making an individual service request 171. As utilized herein, the term "interactive data" means data that is being transferred through a network to respond to a user request that remains pending until such data transfer is completed. By contrast, the transfers of other types of data, such as elastic data or background data, can occur within the confines of a service allocation that can be received in response to one of the individual service requests 171. As utilized herein, the term "elastic data" means data that is to be transferred through a network in a timely, but not instantaneous, manner. Additionally, as utilized herein, the term "background data" means data that is to be transferred through a network without any explicit deadline, or with a deadline that is sufficiently in the future so as to practically impart no deadline impediments.

A service broker, such as the service broker 151, can receive one or more of the individual service requests 171 and can aggregate them into the aggregated service requests 172. More specifically, a service broker, such as the service broker 151, can receive individual service requests 171 from specific types of services. Thus, although for illustrative simplicity only a single service broker 151 is illustrated, network consumers executing on the computing devices 111, 112 and 113 can be serviced by multiple service brokers. For example, the e-commerce website computer-executable instructions being executed by the computing device 111 can be serviced by one service broker directed to e-commerce website requests, while the search engine computer-executable instructions being executed by the computing device 112 can be serviced by another, different service broker that can be directed to search engine requests. A service broker directed to, for example, search engine requests can aggregate individual service requests from multiple individual search engines, or search engine components, or can aggregate multiple individual service requests from the same search engine. The aggregated service requests 172 can be provided to a centralized controller, such as the Software Wide Area Network (SWAN) controller 140.

In one embodiment, a centralized controller, such as the SWAN controller 140, can receive network topology, network statistics, network failures, and other like network information via the communication 182 from a network controller 160. The network controller 160 can be specially configured to interact with one or more of the switches 131, 132, 133, 134 and 135, or other like computing devices implementing the network 190. As part of such interaction, the network controller 160 can receive, as illustrated by the communication 181, network information from individual switches, which the network controller 160 can then aggregate into the information provided by the communication 182 to the SWAN controller 140. For example, the network controller 160 can be compliant with the protocols utilized to configure, and collect data from, one or more of the switches 131, 132, 133, 134 and 135. In such a manner, the SWAN controller 140 can obtain information that can enable the SWAN controller 140 to respond to the aggregated service requests 172 that it can receive from service brokers, such as the service broker 151.

One response that can be provided by the SWAN controller 140 to a service broker, such as the service broker 151, can be allocations 173 that the service broker 151 can distribute among the individual services in response to their individual service requests 171. For example, a service broker, such as the service broker 151, can receive a series of individual service requests 171 which can, in total, as an example, represent requests to transfer one hundred gigabytes of data across the network 190 within the next ten minutes. Such requests can be aggregated by the service broker 151 into an aggregated service request 172 that can request, from the SWAN controller 140, an allocation of network services such that the one hundred gigabytes of data could be transferred across the network 190 in the next ten minutes. The SWAN controller 140, can, based upon the network topology, statistics, failures and other like network information that can provided by the network controller 160, such as via the communication 182, determine how much of the services provided by the network 190, such as the requested data transfer services, to allocate to the service broker 151 in response to the aggregated service request 172. For example, the SWAN controller 140 could provide an aggregated allocation 173 providing for the transfer of 25 TB of data across the network 190 in the next ten minutes.

Continuing with such an example, once the service broker 151 receives such an aggregate service allocation 173, the service broker 151 can then dole out individual service allocations 175 to the individual services that had made individual service requests 171. In one embodiment, such a doling out of individual service allocations 175 can be done in a linear manner where a service request for the transmission of ten gigabytes of data in the next ten minutes receives ten times the allocation of a service request for the transmission of one gigabyte of data in the next ten minutes. In another embodiment, such a doling out of individual service allocations 175 can be done utilizing a weighted approach where different requesters can be assigned different weights based upon the priority of their requests, the priority of the processes making the request, the time-centric factors involved, such as close approaching deadlines, network service level goals and contracts, such as a guaranteed minimum allocation of network services, and other like weighting factors. For example, one customer can have signed a contract that guarantees a minimum allocation. In such an instance, network services can be allocated to such a customer until the minimum is met. As another example, a customer you can specify deadlines by which data that the customer is seeks to transmit must have completed its transmission. In such an instance, network services can be allocated to such a customer in a higher proportion then to other customers to satisfy the specified deadlines.

More generically, service brokers, such as the service broker 151, enable a richer interface between customers of the network 190 and the allocators of network services. Thus, the individual service requests 171 can include a myriad of information beyond merely a request for a particular network service, such as a particular amount of bandwidth, for a defined period of time. As illustrated by the above examples, individual service requests 171 can provide deadline information, legal or contractual information, and other like information they can be utilized by a service broker, such as the service broker 151, to determine how to allocate the network allocations that have been allocated to the service broker 151 by the SWAN controller 140. In one embodiment, the various information specified in the individual service requests 171 can be utilized to assign a weighting, and allocations can be made based upon the weighting. Thus, in a simple example, if one customer was assigned a weighting of two, and to other customers were assigned a weighting of one, and those for customers represented the universe of customers among whom a service broker was to allocate network services, then the first customer could be allocated half of the network services allocated to the service broker, while each of the other two customers received another quarter of those services. The SWAN controller 140 can, similarly, take into account such rich data, which can be received through aggregated service requests, such as the aggregated service requests 172, and can make weighted allocations in an analogous manner.

To determine how much of a network service the SWAN controller 140 can allocate to service brokers, such as the allocations 173 to the service broker 151, the SWAN controller 140 can consider multiple paths through the network 190 in order to maximize the utilization of the capacity of the network 190. For example, and as will be described in further detail below, the SWAN controller 140 can identify paths through the network 190 that string together multiple individual links, each of which can have additional capacity that can be utilized to transmit more data through the network 190.

In identifying and configuring such paths, the SWAN controller 140 can provide packet labeling and forwarding rules 183 to the network controller 160. More specifically, in one embodiment, the SWAN controller 140 can establish paths through the network 190 by instructing ingress computing devices, such as ingress switches, to flag packets belonging to a particular consumer, or a particular type of consumer. The SWAN controller can also instruct other computing devices, such as the switches or routers that route data through the network 190, to route packets having those flags in a specific way, such as will be described in greater detail below with reference to FIG. 2. In such an embodiment, consumers of network services need not generate packets any differently, but such packets will be routed along different paths in the network 190 in accordance with the packet labeling and forwarding rules 183 established by the SWAN controller 140. The SWAN controller 140 can, thereby, establish other routes through the network 190, and can then allocate such routes to service brokers, such as via the service allocations 173 communicated by the SWAN controller 140 to the service broker 151, thereby ensuring that the capacity of the network 190 is being efficiently utilized.

The network controller 160, upon receiving the packet labeling and forwarding rules 183, can translate such rules into appropriate individual switch instructions 184, which the network controller 160 can then communicate to one or more of the switches of the network 190, such as the exemplary switches 131, 132, 133, 134 and 135. For example, the network controller 160 can generate individual switch instructions 184 in conformance with the programming methodology employed by the switches 131, 132, 133, 134 and 135 to generate or modify flow tables, including the addition of conditionals based on whether a packet is flagged in a specified manner. As another example, the network controller 160 can generate individual switch instructions 184 in conformance with the programming methodology employed by an ingress switch to flag packets in a specified manner.

Although described with reference to the service broker 151, the operation of the SWAN controller 140 and the service broker 152, also illustrated in the system 100 of FIG. 1, can occur in an analogous manner. Thus, for example, individual consumers executing on one or more of the computing devices 121, 122 and 123 can transmit individual service requests 191 to the service broker 152, which can then aggregate such service requests into aggregated service requests 192 that the service broker 152 can communicate to the SWAN controller 140, such as in the manner described in detail above. In response, the SWAN controller 140 can provide aggregate service allocations 193 to the service broker 152, and the service broker 152 can then dole out individual service allocations 195 from the aggregate service allocations 193.

Although only a single layer of service brokers are illustrated in the exemplary system 100 of FIG. 1, in other embodiments multiple hierarchies of service brokers can enable greater scalability of the mechanisms and systems described herein. For example, an initial layer of service brokers can receive individual service requests and aggregate them into aggregated service requests, and then a subsequent layer of service brokers can receive those aggregated service requests and aggregate them further into further aggregated service requests. Similarly, a higher layer of service brokers can receive aggregated service allocations, such as from the SWAN controller 140, and can divide them into smaller, more discreet service allocations and then send them to lower layers of service brokers. Those lower layers of service brokers can then further divide the allocations, ultimately generating individual service allocations for individual consumers of network services.

Upon receiving individual service allocations, such as the individual service allocations 175, or the individual service allocations 195, the customers of the network services to whom such individual service allocations are allocated can ensure that their utilization and consumption of such network services does not exceed the allocations assigned to them. Thus, for example, if a search engine network service consumer had requested network services sufficient to transmit ten gigabytes of data within ten minutes, and was only assigned a sufficient amount of bandwidth to transmit five gigabytes of data within ten minutes, then such a search engine, or components thereof, can provide mechanisms to ensure that the data transmitted by such a search engine does not exceed the bandwidth allocated to it. In other embodiments, rate limitations can be enforced by networked server computing devices or the switches through which such data is transferred.

In one embodiment, individual consumers of network services can maintain communications with a service broker, such as the service broker 151 on a fairly frequent basis. For example, the individual service requests 171 made by individual consumers of network services can be made to a service broker, such as the service broker 151, every couple of seconds or every minute. The service broker 151 can then seek to satisfy such individual service requests 171 by providing individual service allocations 175 from the aggregate service allocations 173 that can have been provided to the service broker 151 by the SWAN controller 140. The communications between the service broker 151 and the SWAN controller 140, such as the aggregated service requests 172 and the aggregated service allocations 173 can occur on longer time intervals. For example, the service broker 151 can generate an aggregated service request 172 once every ten minutes and the aggregated service request 172 can comprise an aggregation of the service requests received over a similar period of time. The aggregated service allocations 173 can then, similarly, provide service allocations for an extended period of time, from which the service broker 151 can dole out the individual service allocations 175 on a more frequent basis in response to the more frequently received individual service requests 171.

In one embodiment, if excess capacity exists from among the aggregated service allocations 173 previously provided to the service broker 151, by the SWAN controller 140, the service broker 151 can utilize such excess capacity to provide individual service allocations 175 to new consumers or new individual service requests 171. In such a manner, such a new individual service request 171 can avoid waiting for a subsequent aggregated service request 172 to be generated by the service broker 151, and a subsequent aggregated service allocation 173 to be generated by the SWAN controller 140. For example, if the SWAN controller 140 had allocated bandwidth through the network 190 to the service broker 151, which the service broker 151 had not yet allocated to a consumer, a new consumer, or a new request for additional bandwidth, can be responded to, by the service broker 151, from the excess bandwidth that remains allocated to the service broker 151, without having to transmit another aggregated service request 172, and without having to wait until the next scheduled aggregated service request 172 is transmitted to the SWAN controller 140, and an associated aggregated service allocation 173 is provided in response.

In another embodiment, the SWAN controller 140 can provide callbacks, such as the callbacks 174 and 194, with which the SWAN controller 140 can use to notify service brokers, such as the service broker 151 and the service broker 152, of changes to, for example, the service allocations that have been allocated to those service brokers. For example, if the network information 181 indicates a fault along a particular path, the network controller 160 can communicate such a failure to the SWAN controller 140 via the communication 182. Such a failure can negatively impact the service available from the network 190. For example, such a failure can negatively impact the amount of bandwidth available through the network 190. In such a case, the service allocations allocated to the service brokers, such as the aggregate service allocations 173 allocated to the service broker 151, or the aggregate service allocations 193 allocated to the service broker 152 may be too great and may result in the data attempting to be transmitted through the network 190 exceeding the current, reduced, bandwidth of the network 190. Plus, in one embodiment, the SWAN controller 140 can utilize a call back, such as the callbacks 174 and 194, to notify the service brokers, such as the service brokers 151 and 152 that there has been a change to the service allocations that have been allocated to those service brokers.

Figure 2:
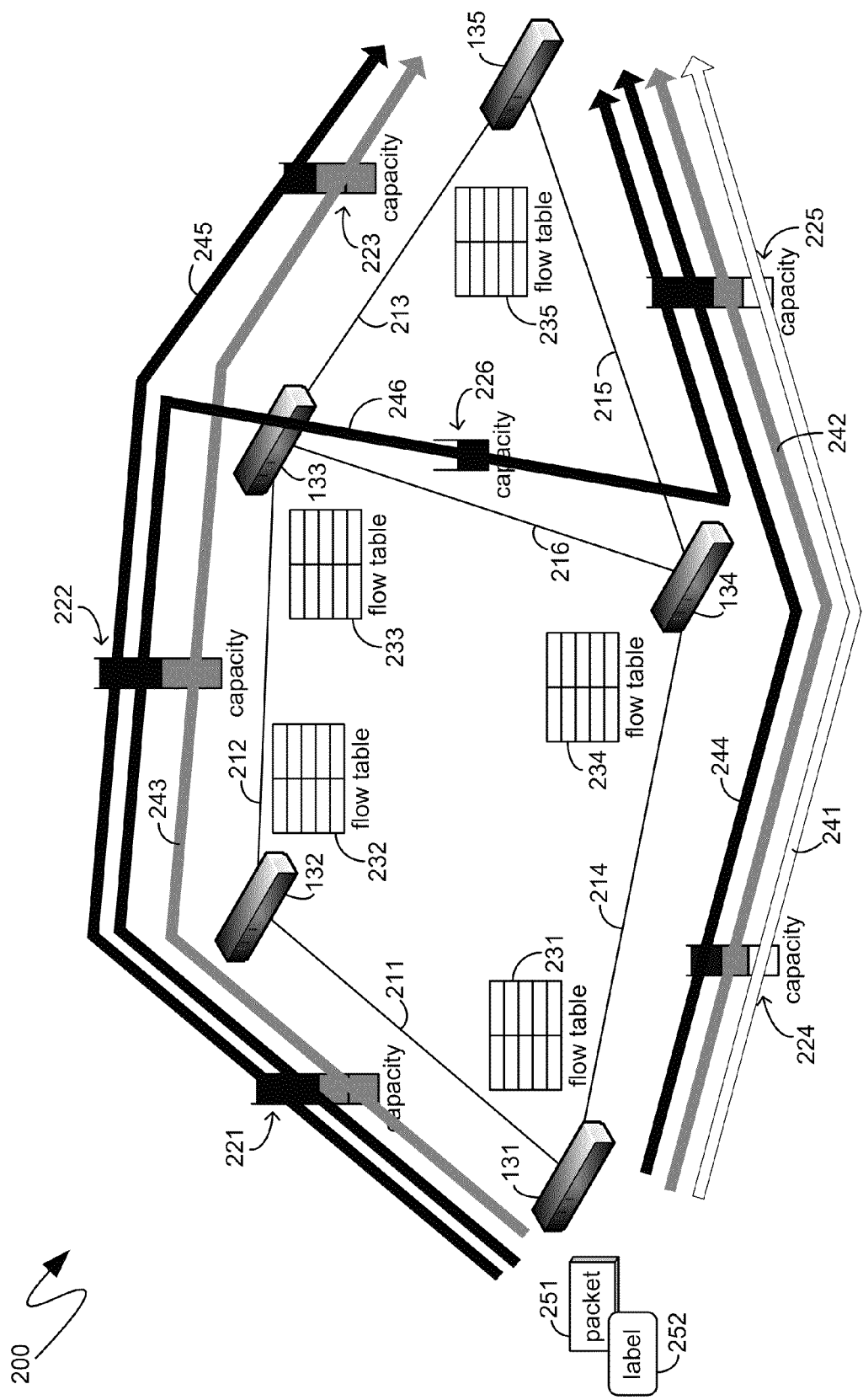
FIG. 2 is a block diagram of an exemplary configuration of network services to accommodate requests and increase network utilization.

Turning to FIG. 2, the system 200 shown therein illustrates a portion of the exemplary network 190 (shown in FIG. 1), namely the portion comprising the links established by exemplary switches 131, 132, 133, 134 and 135. As illustrated by the system 200 of FIG. 2, the exemplary switches 131, 132, 133, 134 and 135 can be connected via links 211, 212, 213, 214, 215 and 216. For example, the exemplary switch 131 can be connected to the exemplary switch 132 via the link 211. Such a link can have a determined capacity to transmit data along it, which is graphically illustrated in FIG. 2 as the capacity 221. In a similar manner, the link 212 can have a capacity 222, the link 213 can have a capacity 223, the link 214 can have a capacity 224, the link 215 can have the capacity 225 and the link 216 can have a capacity 226. Additionally, each of the exemplary switches 131, 132, 133, 134 and 135 can have a flow table associated with them that can specify how such switches are to direct packets passing through them. For example, the switch 131 can have a flow table 231 that can specify that packets having one type of label are to be directed along the link 211, while packets having another type of label are to be directed along the link 214. In such a manner, as will be described in greater detail below, specific paths through a network can be established, such as by the SWAN controller 140.

For example, as illustrated by the communication 241, shown in white in FIG. 2, a certain amount of data can be transmitted through the network that can be the interactive data defined above. As can be seen from FIG. 2, in the illustrated example, such interactive data can consume some of the capacity 224 of the link 214 and some of the capacity 225 of the link 215. As indicated previously, in one embodiment, such interactive data need not explicitly request any allocation of network services and can, instead, simply consume the illustrated portion of the capacity 224 of the link 214 and the capacity 225 of the link 215 in a traditional manner. In one embodiment, for purposes of allocating the remaining capacity, a centralized controller, such as the SWAN controller 140 (shown in FIG. 1), can estimate the amount of capacity that will be consumed by interactive data, such as the capacity consumed by the communication 241. Such an estimate can be based on historical capacity utilizations of such interactive data using predictors such as an exponentially weighted moving average, or other like predictors. The remaining capacity can then be identified and allocated.

To illustrate the allocation of capacity, the centralized controller can allocate capacity for elastic data communications 242 and 243. As illustrated in the exemplary system 200 of FIG. 2, communication 242 can be directed along the links 214 and 215 and can consume additional ones of the capacity 224 and 225, respectively. Similarly, communication 243 can be directed along the links 211, 212 and 213 and can consume some of the capacity 221, 222 and 223, respectively, as illustrated. For purposes of providing an illustrative example, the communications 242 and 243 can comprise all of the elastic data communications for which capacity was currently requested. In such an instance, a centralized controller can seek to identify additional paths through the network in which there can exist capacity and through which background data can be routed. For example, the link 216 can have a capacity 226 that can be unutilized by the interactive data represented by the communication 241 and the elastic data represented by the communications 242 and 243. Thus, one path along which background data can be routed, in the present example, can be a path comprised of the links 211, 212, 216 and 215, as illustrated by the communication 246. The communication 246 can, thereby, consume some of the capacity 221 of the link 211, some of the capacity 222 of the link 212, some of the previously unused capacity 226 of the link 216, and some of the capacity 225 of the link 215. Additional communications 244 and 245 can also represent routes through which background data can be routed through the network.

To cause the computing devices of a network, such as the switches 131, 132, 133, 134 and 135, to route packets in the manner determined, and illustrated by the exemplary system 200 of FIG. 2, packets, such as the exemplary packet 251 can have one or more labels, such as the label 252 applied to them, such as by an ingress switch. More specifically, the packet 251 can be received into the network through an ingress switch which, in the present example illustrated by FIG. 2, can be the switch 131. The switch 131 can have been programmed with a set of rules that packets received from a particular consumer, or otherwise identified as carrying, for example, elastic data, are to have a label 252 applied to them, and the label 252 can specify a value of "X". Each of the switches 131, 132, 133, 134 and 135 can then comprise flow tables, such as the flow tables 231, 232, 233, 234 and 235, respectively, that can specify specific links along which packets having a label having a value of "X" are to be directed. For example, the flow table 231 of the switch 131 can have an entry indicating that packets having a label with a value of "X" are to be directed either through the link 211 or through the link 214. Continuing with the example, the flow table 232, of the switch 132, can have an entry indicating that packets having a label with a value of "X" are to be directed through the link 212. Similarly, the flow table 233, of the switch 133, can have an entry indicating that packets having a label with a value of "X" are to be directed through the link 213, and the flow table 234, of the switch 134, can have an entry indicating that packets having a label with a value of "X" are to be directed through the link 215. In such a manner, discrete paths through the network can be selected and then implemented by rules that can be entered into flow tables and carried out by switches, or other like special-purpose computing devices.

One straightforward mechanism by which a set of paths can be encoded and referenced in flow tables can be to encode each path using a unique label and a corresponding rule in the switch. Thus, for example, packets to be sent along the communication 245, illustrated in FIG. 2, can be labeled with one identifier, packets to be sent along the communication 246 can be labeled with another, different identifier, end packets to be sent along the communication 244 can be labeled with yet another, different identifier. However, such a representation can be wasteful because multiple rules are needed even when two or more paths traverse identical links or combinations of links. For example, the communications 241, 242, 244 and 246 all traverse the link 215. Thus, in one embodiment, paths can be combined along a destination rooted tree, and a single label can be utilized per tree. In such a manner, the various disparate paths through the network can be aggregated into a set of reverse arborescence trees, and a single unique label can be utilized per tree.

In one embodiment, if the rules entered into a flow table, such as the flow table 231, specify that a packet having a specific label can be directed through one of multiple links, the link through which any individual packet is directed can be independent of the link to which any other packet was directed, and can, instead, be randomly selected from among the multiple links identified in the flow table as being links that such a packet could be directed through. In another embodiment, however, the link through which any individual packet is directed can be dependent on the links prior packets were directed through. For example, a round-robin approach can be implemented wherein the link through which an individual packet is directed, when given a choice among two or more different lengths, can always be different from the link through which an immediately preceding packet was directed. When packets can be directed through one of multiple links, packets can be inspected to ensure that packets of a flow are not directed through two or more different links, such that the packets of the flow could arrive at their destination out of order. For example, source addresses, destination addresses port numbers and protocol information can be examined to determine whether or not two or more packets from the same flow and, if it is determined that two or more packets are from the same flow, than those packets can be directed along the same link.

As can be seen from the above descriptions, the switches, such as the exemplary switches 131, 132, 133, 134 and 135 can be so-called "software-controlled" switches which can support specifying more expressive forwarding rules, such as those described in detail above, to steer traffic. Additionally, such software controlled switches can also monitor ongoing events and changes in the network, such as a link failure or a switch failure. Upon detecting such an event, information can be relayed, such as to the network controller 160 (shown in FIG. 1), thereby providing the mechanisms described above with updated network topology and other like network information.

While the simplified network illustrated in FIG. 2 enables easier understanding of the mechanisms described, networks are likely to be substantially more complex and, consequently, can comprise a myriad of paths through such a network through which packets can be routed. In one embodiment, for processing efficiency, a handful of paths through a network can be precomputed and a centralized controller can merely select from among one of the precomputed paths. For example, returning to the example illustrated in system 200 of FIG. 2, the path defined by the links 211, 212, 216 and 215 can have been precomputed and, as such, can have been one of the paths considered by a centralized controller to determine whether any capacity exists through such a path that has not yet been utilized. Thus, for example, if the path defined by the links 211, 212, 216 and 215 was not a precomputed path, then the centralized controller could not have generated a routing of background data in accordance with the communication 246, even though the capacity 226 can remain underused, since the centralized controller would not have known of such a path through the network. For ease of reference, such precomputed paths can be referred to as "candidate paths" which a controller can select from for purposes of allocating capacity and providing for efficient utilization of network services.

Figure 3:
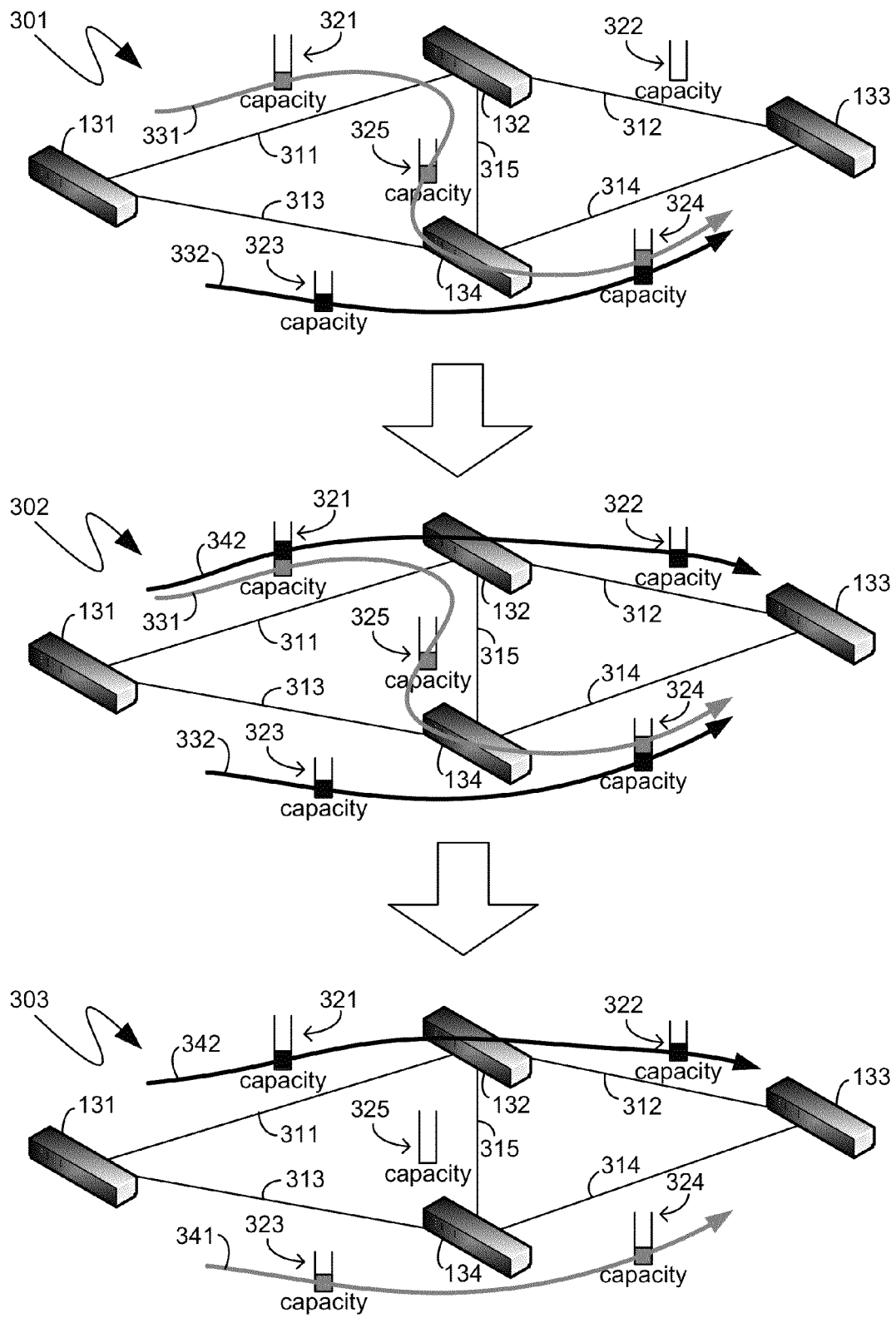
FIG. 3 is a block diagram of an exemplary incremental network reconfiguration.

In one embodiment, the paths through a network can be reconfigured, or the links of the network itself can be reconfigured to provide for a more efficient allocation of network services. However, when performing such a network reconfiguration, existing allocations can cause overcapacity on certain network links. For example, and with reference to FIG. 3, an initial network configuration 301 is illustrated at the top of FIG. 3. In the exemplary initial network configuration 301, switches 131, 132, 133 and 134 can be interconnected via links 311, 312, 313, 314 and 315. Each of those links can have corresponding capacity 321, 322, 323, 324 and 325. In the exemplary initial configuration 301, a set of communications 331 can consume some of the capacity 321 of the link 311, some of the capacity 325 of the link 315, and some of the capacity 324 of the link 314. Another set of communications 332 can consume some of the capacity 323 of the link 313 and some of the capacity 324 of the link 314.

For illustrative purposes, a reconfiguration of the exemplary initial configuration 301 into an exemplary final configuration 303 can be desired. The exemplary final configuration 303, as illustrated, can move the path taken by the communications 332 from the links 313 and 314, to the links 311 and 312, as illustrated by the new communication 342. Similarly, the exemplary final configuration 303 can move the path taken by the communications 331 from the links 311, 315 and 314, to the links 313 and 314, as illustrated by the new communication 341. Were such a reconfiguration to be performed in a single step, there could exist the possibility that certain links would become oversaturated. For example, the link 311, during a transition period, could have all of the packets of the new communication 342 routed along the link 311, while the packets of the prior communication 331 continue to also be routed along the link 311. To accommodate such situations, in one embodiment, a piecemeal approach can be adopted whereby incremental changes are made. For example, the exemplary intermediate configuration 302 illustrates one exemplary incremental change from the exemplary initial configuration 301. In particular, in the exemplary intermediate configuration 302, as part of the reconfiguration the communications 332 can be split among the existing communications 332 and new communications 342 with each taking approximately half of the total data that was originally sent through the communications 332. In such a manner, the capacity 321 of the link 311 can avoid being oversaturated.

From the exemplary intermediate configuration 302 to the final configuration 303, another incremental change can be made, wherein the data transmitted along the communications 332 is decreased to zero and all such communications are transmitted along communications 342, and, the existing communications 331 can transition to the new communications 341.

To enable such reconfiguration, in one embodiment, some capacity can remain unutilized across some or all of the links of the network. For example, if the capacity 321 of the link 311 was fully utilized by the communications 331 in the exemplary original configuration 301, a subsequent incremental change, wherein at least some of the data sent along communications 332 is now transitioned to be sent along new communications 342, as illustrated by the exemplary intermediate configuration 302, could never have occurred, since the capacity 321 would have been wholly utilized, and no additional capacity would have remained to accept the data being communicated along new communications 342.

In another embodiment, rather than reserving unused capacity in the links, background data transfers can be treated as unused capacity for purposes of network reconfiguration. For example, if the capacity 321 of the link 311 was fully utilized, but some of that utilization was background data transfers, then, in implementing the exemplary intermediate configuration 302, some of those background data transfers through the link 311 can be stopped, and additional capacity, among the capacity 321, can be made available in order to accommodate the capacity consumed by the new communications 342. Once the exemplary final configuration 303 is achieved, the previously halted background data transfers can be reinstated, either through link 311, or through an analogous link that now comprises excess capacity that can be allocated to such background data transfers.

The network reconfiguration described above can be implemented through changes in the flow tables of the switches in the same manner as that described in detail above. In particular, as one example, in transitioning between the exemplary initial configuration 301, and the exemplary intermediate configuration 302, the flow tables of the switch 131, which are not explicitly illustrated in FIG. 3, can be updated such that packets carrying labels identifying them as packets that were to be directed along the communication 332 can now be divided among the communications 332 and 342, such as in the random or round-robin fashion described in detail above.

Figure 4:
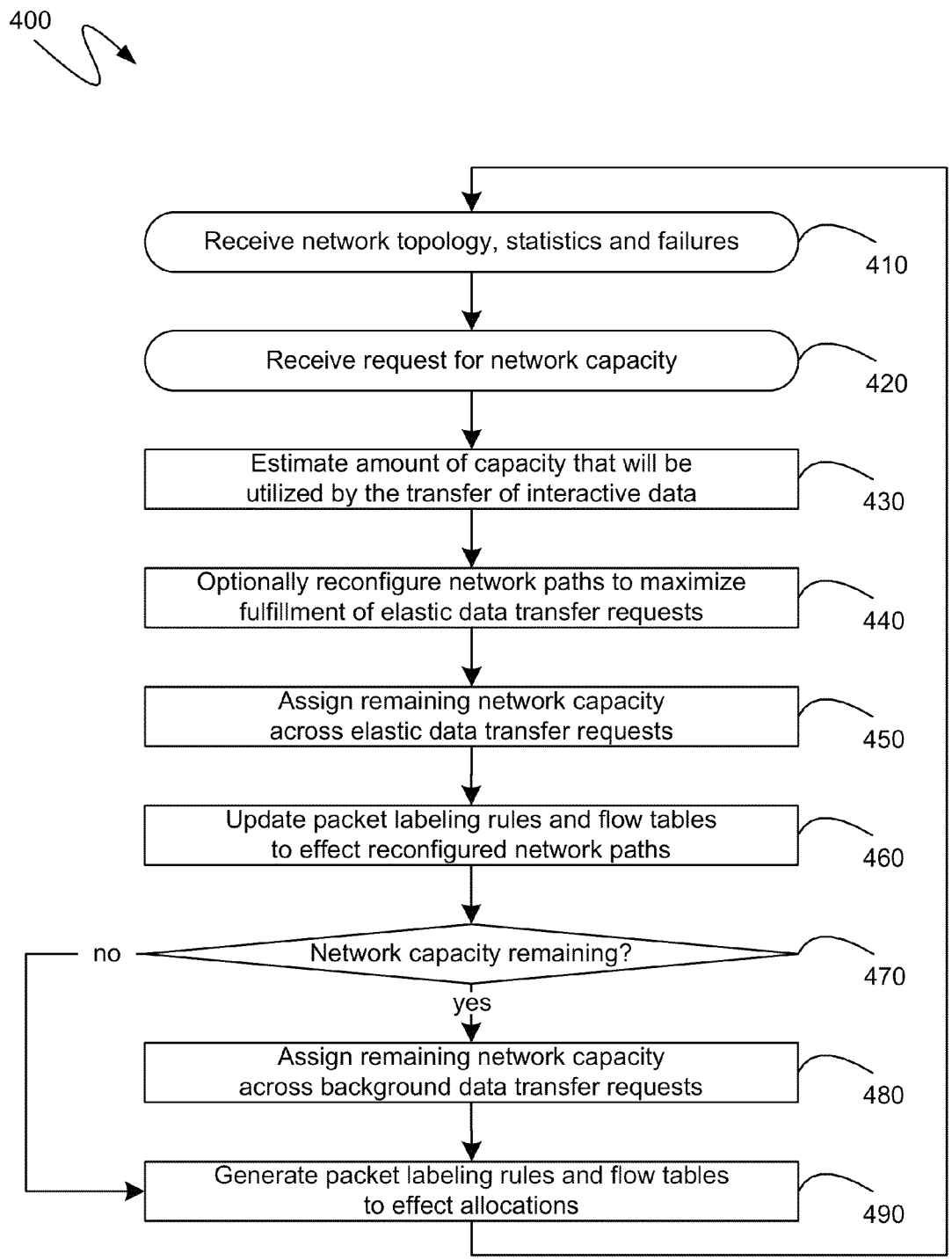
FIG. 4 is a flow diagram of an exemplary configuration process for providing greater network utilization.

Turning to FIG. 4, the flow diagram 400 shown therein illustrates an exemplary series of steps by which network services can be allocated and network capacity can be consistently consumed, providing the attendant efficiency benefits thereof. Initially, as illustrated, at step 410 network topologies, statistics, failures and other like network information can be received and, coincidentally with the receipt of such network information, at step 420, requests for an allocation of network services, such as network capacity or network bandwidth, can be received. At step 430, an estimate can be made of the amount of network services that will be consumed by the transfer of interactive data through the network. As indicated previously, in one embodiment, interactive data need not make any requests for network capacity, such as the requests received at step 420. Subsequently, at step 440, an optional step can be performed where the network can be reconfigured in such a manner so as to maximize the amount of network services, such as network capacity, remaining to allocate. Such remaining network capacity can be allocated to network service requests sourced from consumers that seek to transfer elastic data across the network, as indicated by step 450 and, as part of such an allocation, packet labeling rules and flow tables can be updated, as indicated by step 460

If, as determined at step 470, any network capacity remains, such capacity can be assigned to consumers that seek to utilize the network to transfer background data across it. In such a manner, a network can be consistently utilized at a high capacity, resulting in an efficient utilization of network costs. Thus, for example, at step 480, the network capacity determined to be remaining at step 470 can be assigned to those consumers of network services that seek to transmit background data across the network. Subsequently, at step 490, packet labeling rules and flow tables can be generated to affect the allocations of step 480. If, at step 470, there is no network capacity remaining that has not already been allocated, then processing can skip directly to step 499. Subsequently, the processing of steps 410 through 490 can be repeated for subsequent requests for network capacity and for subsequent network notifications.

In another embodiment, not specifically illustrated in diagram 400 of FIG. 4, network capacity can be assigned, as part of a single process, to both customers seeking to transfer elastic data and customers seeking to transfer background data. In such an embodiment, step 450 can assign the remaining network capacity to the transfer of both kinds of data, and step 460 can update the packet labeling rules and flow tables accordingly. Steps 480 and 490 can, thereby, be eliminated.

As illustrated by the flow diagram 400 of FIG. 4, at step 410, information regarding network failures can be received. In one embodiment, the reconfiguring of the network, such as at step 440, can be performed in response to the receipt, at step 410, one or more failures within the network. Subsequently, after the network is reconfigured at step 440 to accommodate such failures, processing can proceed to step 460 with the packet labeling rules and flow tables can be updated to effect the network reconfiguration.

Figure 5:
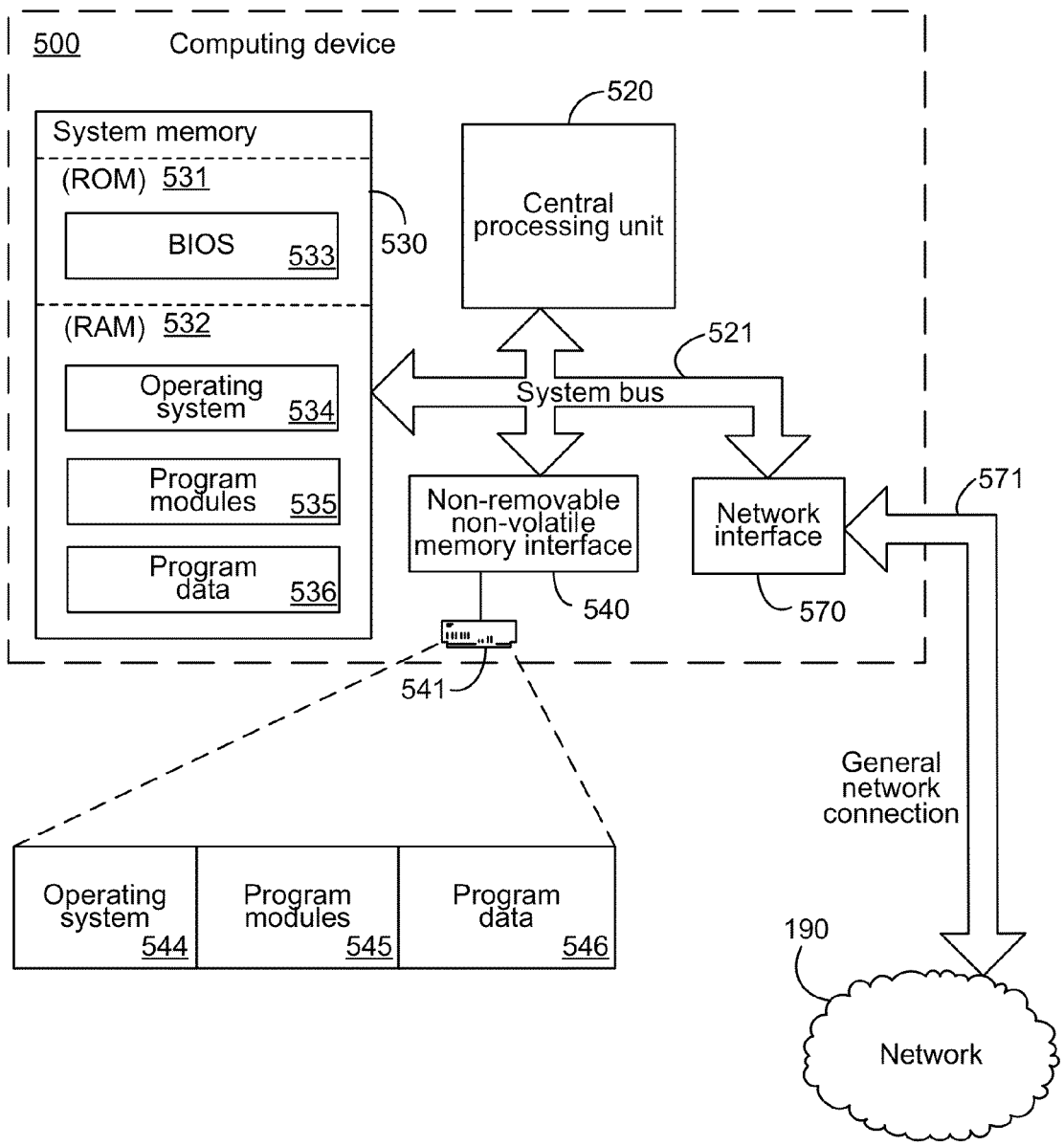
FIG. 5 is a block diagram illustrating an exemplary general purpose computing device.

Turning to FIG. 5, an exemplary computing device is illustrated, which can include both general-purpose computing devices, such as can execute some of the mechanisms detailed above, and specific-purpose computing devices, such as the switches described above. The exemplary computing device 500 can include, but is not limited to, one or more central processing units (CPUs) 520, a system memory 530 and a system bus 521 that couples various system components including the system memory to the processing unit 520. The system bus 521 may be any of several types of bus structures including a memory bus or memory controller, a peripheral bus, and a local bus using any of a variety of bus architectures. Depending on the specific physical implementation, one or more of the CPUs 520, the system memory 530 and other components of the computing device 500 can be physically co-located, such as on a single chip. In such a case, some or all of the system bus 521 can be nothing more than communicational pathways within a single chip structure and its illustration in FIG. 5 can be nothing more than notational convenience for the purpose of illustration.

The computing device 500 also typically includes computer readable media, which can include any available media that can be accessed by computing device 500. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

When using communication media, the computing device 500 may operate in a networked environment via logical connections to one or more remote computers. The logical connection depicted in FIG. 5 is a general network connection 571 to the network 190, which can be a local area network (LAN), a wide area network (WAN) such as the Internet, or other networks. The computing device 500 is connected to the general network connection 571 through a network interface or adapter 570 that is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

The computing device 500 may also include other removable/non-removable, volatile/nonvolatile computer storage media. By way of example only, FIG. 5 illustrates a hard disk drive 541 that reads from or writes to non-removable, non-volatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers here to illustrate that, at a minimum, they are different copies.

As can be seen from the above descriptions, a software-controlled network for greater network utilization has been presented. Which, in view of the many possible variations of the subject matter described herein, we claim as our invention all such embodiments as may come within the scope of the following claims and equivalents thereto.

We claim:

1. A system comprising:
a controller performing steps comprising:
receiving aggregated requests for network service
receiving network information about a network providing the network service;
allocating the network service into aggregate service allocations in accordance with the received network information; and
responding to the aggregated requests with the aggregate service allocations; and
at least one service broker performing steps comprising:
receiving individual requests for the network service;
aggregating the received individual requests into at least one of the aggregated requests for the network service;
transmitting the at least one of the aggregated requests to the controller;
receiving, in response to the transmitted at least one of the aggregated requests, at least one of the aggregate service allocations; and
doling out allocations of the network service, from the received at least one of the aggregate service allocations, in response to the received individual requests for the network service.

2. The system of claim 1, further comprising a network controller, different from the controller, the network controller performing steps comprising:
receiving from the network, the network information;
receiving, from the controller, packet labeling and forwarding rules for implementing the aggregate service allocations;
wherein the packet labeling rules identify packets to be labeled with a first identifier and wherein further the forwarding rules identify one or more links of the network through which to transmit a packet labeled with the first identifier.

3. The system of claim 1, wherein the controller performs further steps comprising: estimating a utilization of the network service by interactive data, the interactive data bypassing the controller's service allocations.

4. The system of claim 1, wherein the allocation of the network service is performed by the controller in accordance with precomputed paths through the network, each link of each precomputed path having a capacity informing the allocation of the network service.

5. The system of claim 1, wherein the controller performs further steps comprising: establishing a callback mechanism with one or more of the at least one service broker; and utilizing the established callback mechanism to modify at least a portion of a previously provided service allocation due to a topology change in the network.

6. The system of claim 1, wherein the at least one broker performs further steps comprising: doling out, in response to a newly received individual request for the network service, allocations of the network service from an excess allocated to the at least one broker prior to receiving the newly received individual request.

7. The system of claim 1, wherein the controller performs further steps comprising: reconfiguring the network from a first configuration to a second configuration by temporarily and incrementally changing a network configuration so as to avoid overcapacity on any one or more links of the network as part of the reconfiguration to the second configuration.

8. The system of claim 7, wherein the temporary and incremental changes to the network configuration result in at least one link receiving an increased utilization during the temporary and incremental change, the increased utilization consuming either excess capacity of the link or capacity of the link freed up by the stopping of utilization of the link capacity by background data transfers.

9. The system of claim 1, wherein the individual requests for the network service comprise an indication of a temporal requirement of such requests and a priority of such request.

10. The system of claim 1, wherein the allocations of the network service doled out by the at least one service broker are enforced by consumers of the network service to whom the allocations of the network service were doled out.

11. A method of allocating a network service, the method comprising the steps of:
receiving requests for the network service, the requests comprising requests to transfer elastic data in a time-specified manner and requests to transfer background data in an opportunistic manner;
receiving information about the network providing the network service;
estimating a utilization of the network service by interactive data bypassing the allocations; and generating packet labeling and packet forwarding rules, the packet labeling rules identifying at least one collection of packets to be labeled with a first label and the packet forwarding rules specifying at least one link through which to transmit packets labeled with the first label, the generated packet labeling and packet forwarding rules allocating a remaining network service first to the elastic data transfer requests and then to the background data transfer requests.

12. The method of claim 11, wherein a determination of the remaining network service is made in view of precomputed paths through the network, each link of each precomputed path having a capacity informing the determination of the remaining network service.

13. The method of claim 11, further comprising the steps of:
reconfiguring the network from a first configuration to a second configuration by temporarily and incrementally changing a network configuration so as to avoid overcapacity on any one or more links of the network as part of the reconfiguration to the second configuration.

14. The method of claim 13, wherein the temporary and incremental changes to the network configuration result in at least one link receiving an increased utilization during the temporary and incremental change, the increased utilization consuming either excess capacity of the link or capacity of the link freed up by the stopping of utilization of the link capacity by background data transfers.

15. The method of claim 11, further comprising the steps of:
generating an aggregate network service allocation comprised of an aggregation of network service allocations for multiple consumers of the network service; and
transmitting the aggregate service allocation to a service broker in response to an aggregated request for the network service from the service broker.

16. The method of claim 15, further comprising the steps of: establishing a callback mechanism with the service broker; and utilizing the established callback mechanism to modify at least a portion of a network service allocation previously provided to the service broker.

17. A method of reconfiguring a network, the method comprising the steps of:
selecting a second configuration into which to reconfigure a network currently in a first configuration differing from the second configuration;
selecting a next incremental configuration, differing from both the first configuration, the second configuration and a preceding incremental configuration, the next incremental configuration differing from the preceding incremental configuration and thereby causing at least one link to receive an increased utilization, the increased utilization consuming either excess capacity of the link or capacity of the link freed up by the stopping of utilization of the link capacity by background data transfers; and
repeating the selecting the next incremental configuration until the network is configured in the second configuration.

18. The method of claim 17, further comprising the steps of: generating packet labeling and packet forwarding rules, the packet labeling rules identifying at least one collection of packets to be labeled with a first label and the packet forwarding rules specifying at least one link through which to transmit packets labeled with the first label, the generated packet labeling and packet forwarding rules resulting in a change from the preceding incremental configuration to the next incremental configuration.

19. The method of claim 17, wherein the second configuration provides greater network service to allocate than the first configuration.

20. The method of claim 12, wherein the selecting the next incremental configuration is made in view of precomputed paths through the network, each link of each precomputed path having a capacity informing the selecting the next incremental configuration.

* * * * *